J. HERICK.
HANDLE FASTENING DEVICE.
APPLICATION FILED MAR. 23, 1920.
1,410,755.
Patented Mar. 28, 1922.
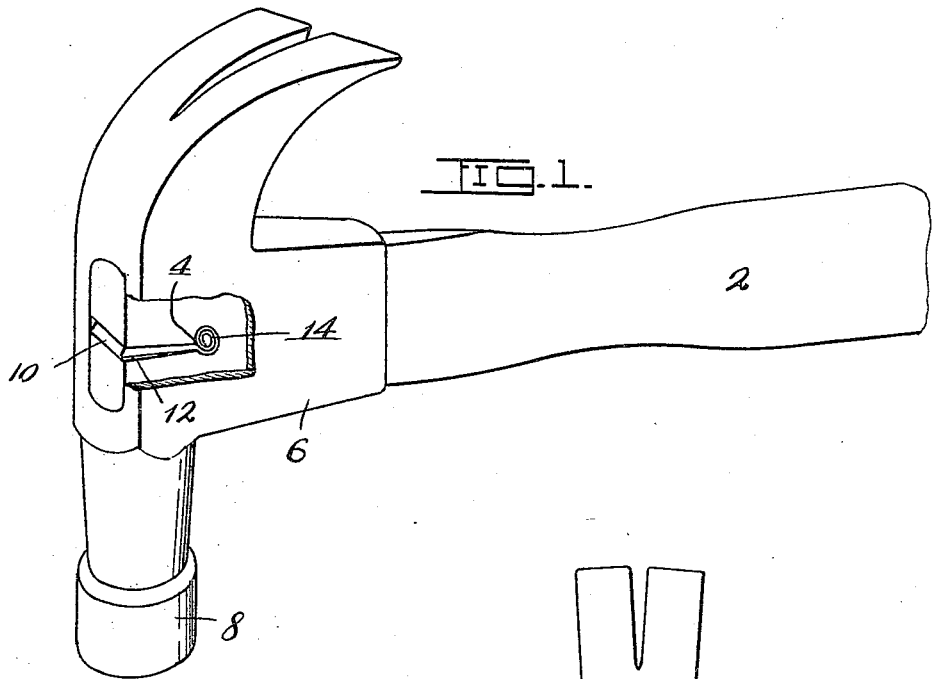
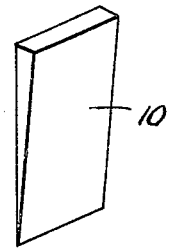
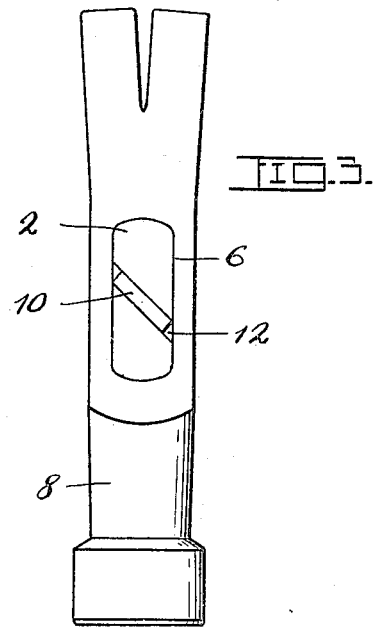
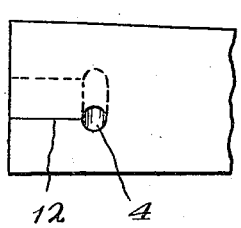
WITNESS:
Fred C. Fischer
INVENTOR:
John Herick,
BY
F. G. Fischer
ATTORNEY.

UNITED STATES PATENT OFFICE.

JOHN HERICK, OF KANSAS CITY, MISSOURI.

HANDLE-FASTENING DEVICE.

1,410,755.  Specification of Letters Patent.  Patented Mar. 28, 1922.

Application filed March 23, 1920. Serial No. 368,077.

*To all whom it may concern:*

Be it known that I, JOHN HERICK, a citizen of the United States, residing at Kansas City, in the county of Jackson and State of Missouri, have invented certain new and useful Improvements in Handle-Fastening Devices, of which the following is a specification.

My invention relates to a handle fastening device and my object is to provide a device of this character more especially designed for fastening wooden handles in hammers, hatchets, axes and other tools, the device being adapted to permit fastening the handle in place in the eye of the tool without injury to said handle.

In carrying out the invention, I employ a wedge adapted to be driven into a split end of the handle, said split terminating in a recess in which the tapered end of the wedge is coiled as it is driven inwardly to spread the end of the handle and cause it to firmly engage the walls of the eye.

In the accompanying drawing which shows a practical embodiment of the invention:

Fig. 1 is a broken perspective view of the handle fastened in a hammer.

Fig. 2 is a detail perspective view of the wedge.

Fig. 3 is an end view of the parts disclosed by Fig. 1.

Fig. 4 is a broken detail of the handle.

In carrying out the invention, I take a wooden handle 2 and bore an opening 4 through the forward portion of said handle. The hole 4 is, preferably, bored obliquely although it may be bored transversely through the handle. The handle 2 is then driven into the eye 6 of the tool 8, which may be a hammer as shown, or any other tool containing an eye for the reception of the wooden handle. A chisel or other sharp edged tool is then used to split the handle 2 from its forward end back to the opening 4 to receive a wedge member 10, which consists of copper or other pliable metal. The wedge 10 is then driven into the split portion 12 of the handle 2 and as its tapered forward end strikes the wall of the hole 4, said tapered end follows the curvature of said wall and coils around therein as indicated at 14 on Fig. 1, at the same time the thick portion of the wedge 10 spreads the forward end of the handle and causes it to firmly engage the wall of the eye 6. By having the tapered end of the wedge 10 coil about in the opening 4 as above stated, it is obvious that said wedge 10 cannot work out of the split 12, but on the contrary is reliably held in place and in turn firmly holds the hammer 8 upon the handle 2.

By merely splitting the handle 2 instead of sawing or otherwise forming an entrance for the wedge 10, no material is removed and consequently the handle is not weakened.

While I have shown and described the invention as applicable to tools, it may also be used to advantage in securing the outer ends of spokes in the fellies of wheels by boring and splitting said spokes to receive the wedges in the manner described for the handle 2.

Having thus described my invention, what I claim and desire to secure by Letters Patent, is:

In combination, a member having an eye, another member adapted to fit into said eye and having an opening extending therethrough and a slit extending from one end of the member to said opening, and a pliable metallic element adapted to be driven longitudinally into the slit and coil about in the opening to reliably hold the two members together.

In testimony whereof I affix my signature, in the presence of two witnesses.

JOHN HERICK.

Witnesses:
F. G. FISCHER,
L. J. FISCHER.